United States Patent [19]
Juen et al.

[11] Patent Number: 6,072,012
[45] Date of Patent: Jun. 6, 2000

[54] ULTRA-HIGH MOLECULAR WEIGHT, SOLUBLE SILOXANE RESINS

[75] Inventors: Donnie Ray Juen, Sanford; Bianxiao Zhong, Midland, both of Mich.

[73] Assignee: Dow Corning Corporation, Midland, Mich.

[21] Appl. No.: 09/224,399

[22] Filed: Dec. 31, 1998

[51] Int. Cl.$^7$ .................................................... C08F 283/12
[52] U.S. Cl. ..................... 525/478; 525/474; 525/477; 528/14; 528/15; 528/18
[58] Field of Search ..................... 525/478, 474, 525/477; 524/588; 528/12, 15, 14, 18, 21, 20, 24

[56] References Cited

U.S. PATENT DOCUMENTS

| | | |
|---|---|---|
| 2,676,182 | 4/1954 | Daudt et al. . |
| 2,814,601 | 11/1957 | Currie et al. . |
| 2,857,356 | 10/1958 | Goodwin . |
| 3,445,420 | 5/1969 | Kookootsedes et al. . |
| 3,528,940 | 9/1970 | Modic . |
| 3,627,851 | 12/1971 | Brady . |
| 4,611,042 | 9/1986 | Rivers-Ferrell et al. . |
| 4,639,489 | 1/1987 | Aizawa et al. . |
| 4,707,531 | 11/1987 | Shirahata . |
| 4,774,310 | 9/1988 | Butler . |
| 4,831,070 | 5/1989 | McInally et al. . |
| 4,865,920 | 9/1989 | Sweet et al. . |
| 5,034,061 | 7/1991 | Maguire et al. . |
| 5,096,981 | 3/1992 | Traver . |
| 5,470,923 | 11/1995 | Krahnke et al. . |
| 5,527,873 | 6/1996 | Kobayashi et al. .................... 528/23 |
| 5,576,110 | 11/1996 | Lin et al. .................... 428/447 |
| 5,708,075 | 1/1998 | Chung et al. .................... 524/765 |

*Primary Examiner*—Robert Dawson
*Assistant Examiner*—Jeffrey B. Robertson
*Attorney, Agent, or Firm*—Timothy J. Troy

[57] ABSTRACT

An ultra-high molecular weight MQ resin and a method for its preparation are disclosed. The ultra-high molecular weight MQ resin has weight average molecular weight of at least 100,000, and the ultra-high molecular weight MQ resin is soluble in organic solvents.

18 Claims, No Drawings

ULTRA-HIGH MOLECULAR WEIGHT, SOLUBLE SILOXANE RESINS

FIELD OF THE INVENTION

This invention relates to siloxane resins and methods for their preparation. More particularly, this invention relates to ultra-high molecular weight siloxane resins that are soluble in organic solvents.

BACKGROUND OF THE INVENTION

The siloxane resins of the present invention are frequently designated "MQ" resins. MQ resins are macromolecular polymers consisting essentially of $R_3SiO_{1/2}$ and $SiO_{4/2}$ units (the M and Q units, respectively) wherein R is a functional or nonfunctional organic group. Those skilled in the art will appreciate that such resins may also include a limited number of $R_2SiO_{2/2}$ and $RSiO_{3/2}$ units, respectively referred to as D and T units. As used herein, the term "MQ resin" means that, on average, no more than about 20 mole percent of the resin molecules are comprised of D and T units.

MQ resins are frequently produced by the acid hydrolysis and subsequent condensation of silicate salts, as disclosed in U.S. Pat. No. 2,676,182 to Daudt et al., Sep. 15, 1950, which is incorporated herein by reference. Such MQ resins are generally produced in such a manner that the resin macromolecules are dissolved in a solvent, which is typically, but not always, an aromatic solvent.

U.S. Pat. No. 2,814,601 to Currie et al., Nov. 26, 1957 discloses that MQ resins can be prepared by converting a water-soluble silicate into a silicic acid monomer or silicic acid oligomer using an acid. When adequate polymerization has been achieved, the resin is end-capped with trimethylchlorosilane to yield the MQ resin.

However, these MQ resins suffer from the drawback that the amount of silanol remaining in the resin after end-capping is large.

U.S. Pat. No. 2,857,356 to Goodwin, Oct. 21, 1958 discloses a method for the preparation of an MQ resin by the cohydolysis of a mixture of an alkyl silicate and a hydrolyzable trialkylsilane organopolysiloxane with water. However, this method suffers from the drawback that large amounts of alkoxy groups and silanol groups remain in the MQ resin, thereby creating the problem of poor storage stability.

U.S. Pat. No. 4,611,042 to Rivers-Ferrell et al., Sep. 9, 1986 discloses a xylene soluble resinous copolymer containing trimethylsiloxane (M) units, alkenyldimethylsiloxane (M) units, and $SiO_{4/2}$ (Q) units. The ratio of alkenyldimethoxysilane units to trimethylsiloxane units is 0.02:1 to 0.5:1. The ratio of total M to Q units is 0.6:1 to 1.2:1.

U.S. Pat. No. 4,707,531 to Shirahata, Nov. 17, 1987 discloses a process for preparing an MQ resin by dripping an alkyl silicate into a mixture of aqueous hydrochloric acid and a trialkylsilane or disiloxane at a temperature of 0 to 90° C. This method creates problems from an environmental standpoint because it generates an aqueous hydrochloric acid solution containing large amounts of methanol, and this method is also not capable of preparing high molecular weight Si—H containing MQ resins.

U.S. Pat. No. 4,774,310 to Butler, Sep. 27, 1988 discloses an MQ resin containing silicon-bonded hydrogen atoms and a method for its preparation. The method comprises heating a siloxane resin and a disiloxane of formula $(HR_2Si)_2O$ in the presence of an acidic catalyst. The reaction mixture formed by heating the resin and disiloxane is then neutralized.

U.S. Pat. No. 5,527,873 to Kobayashi et al., Jun. 18, 1996 discloses a silicone resin and a method for its preparation. The method comprises mixing (a) a silicone resin, (b) an organic solvent, and (c) an acid catalyst to form a reaction product and subsequently reacting the reaction product with a diorganopolysiloxane. The resulting MQ silicone resin has a molecular weight of about 1,000.

Numerous uses have been discovered for MQ resins, including their use as a component in pressure sensitive adhesives, paints, coatings and elastomers. For example, MQ resins can be used in coatings as disclosed in U.S. Pat. No. 3,627,851 to Brady, Dec. 14, 1971, and U.S. Pat. No. 5,034,061 to Maguire et al., Jul. 23, 1991.

MQ resins can also be used in pressure sensitive adhesives as disclosed in U.S. Pat. No. 2,857,356 to Goodwin, Oct. 21, 1958; U.S. Pat. No. 3,528,940 to Modic, Sep. 15, 1970; U.S. Pat. No. 4,831,070 to McInally et al., May 16, 1989; U.S. Pat. No. 4,865,920 No. to Sweet et al., Sep. 12, 1989; U.S. Pat. No. 5,470,923 to Krahnke et al., Nov. 28, 1995; and EP 0 459 292 A2.

Previously, the weight average molecular weight (Mw) of MQ resins has been limited to about 30,000 and the number average molecular weight Mn has been limited to about 7,000. This limitation is inherent in the above-described preparation via hydrolysis and condensation of silicate salts, as attempts to obtain higher molecular weights generally result in an intractable gel.

A higher molecular weight compound based on MQ resins is described in U.S. Pat. No. 4,639,489 to Aizawa et al., Jan. 27, 1987 discloses the reaction of an MQ resin with a hydroxy-terminated polydimethylsiloxane in the preparation of a defoamer. The weight of linear polydimethylsiloxane is, however, much greater than the amount of MQ resin used in the reaction. Thus, the reaction product does not consist essentially of M and Q siloxy units, but consists predominantly of D siloxy units.

Therefore, one object of this invention is to provide an ultra-high molecular weight MQ resin that does not gel. Another object of this invention is to provide an ultra-high molecular weight MQ resin that is soluble in at least one organic solvent in which traditional MQ resins are soluble, such as benzene, toluene, xylene, hexane, heptane, and ketones in order to permit solution reaction of the ultra-high molecular weight MQ resin with other siloxane compounds.

SUMMARY OF THE INVENTION

The present invention relates to an ultra-high molecular weight MQ resin. The weight average molecular weight (Mw) is at least 100,000. Mw is preferably 200,000 to 1,000,000; however Mw can be as high as 2,500,000. The ultra-high molecular weight MQ resin is soluble in at least one organic solvent in which traditional MQ resins are soluble, such as benzene, toluene, xylene, hexane, heptane, and ketones. The ultra-high molecular weight MQ resin comprises the copolymerized reaction product of:

(A) a solid MQ resin with Mw less than 100,000, and (B) a substantially linear polydiorganosiloxane linker having hydrolyzable groups bonded to silicon atoms or silicon bonded hydrogen atoms, wherein components (A) and (B), are copolymerized in a weight ratio of (A):(B) typically ranging from 5.6:1 to 44.5:1.

DETAILED DESCRIPTION OF THE INVENTION

This invention relates to an ultra-high molecular weight MQ resin. "Ultra-high molecular weight MQ resin" means a resin that is prepared by chemically linking (copolymerizing) MQ resin molecules having Mw less than 100,000 with polysiloxane linkers such that the reaction product has a Mw of at least 100,000. The ultra-high molecular weight MQ resin is soluble in at least one organic solvent.

The ultra-high molecular weight MQ resin of this invention comprises the copolymerized reaction product of:

(A) a solid MQ resin having Mw less than 100,000, and (B) a substantially linear polydiorganosiloxane linker.

Component (A) is a solid MQ resin having M and Q siloxy units having the average general formula

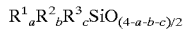

$R^1$ is a hydroxyl group, and a is a number from 0 to 0.2. $R^2$ is a monovalent hydrocarbon group having at least one unsaturated carbon-carbon bond (i.e., vinyl) that is capable of addition reaction with a silicon-bonded hydrogen atom; and b is number from 0 to 1.5. Each $R^3$ is independently selected from the group consisting of alkyl, aryl and arylalkyl groups; and c is a number greater than or equal to 0. However, $1 \leq a+b+c \leq 1.5$; if a+b+c is less than 1, component (A) will be insoluble in organic solvents; and the copolymerized reaction product thereof will also be insoluble in organic solvents. If a+b+c is greater than 1.5, then the MQ resin component (A) will be a viscous liquid, not a brittle solid. When b is less than 0.02, then a is greater than or equal to 0.07; and when a is less than 0.07, then b is greater than 0.02.

MQ resins suitable for use as component (A), and methods for their preparation, are known in the art. For example, U.S. Pat. No. 2,814,601 to Currie et al., Nov. 26, 1957, which is hereby incorporated by reference, discloses that MQ resins can be prepared by converting a water-soluble silicate into a silicic acid monomer or silicic acid oligomer using an acid. When adequate polymerization has been achieved, the resin is end-capped with trimethylchlorosilane to yield the MQ resin. Another method for preparing MQ resins is disclosed in U.S. Pat. No. 2,857,356 to Goodwin, Oct. 21, 1958, which is hereby incorporated by reference. Goodwin discloses a method for the preparation of an MQ resin by the cohydrolysis of a mixture of an alkyl silicate and a hydrolyzable triakylsilane organopolysiloxane with water.

A preferred method for preparing a solid MQ resin for component (A) is as follows. A flowing stream of aqueous sodium silicate is rapidly mixed in a continuous manner with aqueous hydrochloric acid flowing at a rate sufficient to reduce the pH of the resulting solution to below pH 2, preferentially near pH 0. Rapid mixing is critical during this step to minimize the amount of time material experiences local concentration regimes with pH 5–8, a range in which silicate solutions have minimum stability towards gelation. The acidified silicate solution is allowed to pass through a pipe with a diameter and length sufficient to allow the desired molecular size distribution to develop. This flowing aqueous solution is then dropped into a stirred heated reaction mixture into which isopropanol, trimethylchlorosilane, and hexamethyldisiloxane are also being added to enable a Lentz-type capping of silanol moieties on the polymerizing silicate species with trimethylsilyl groups. The two-phase mixture leaving this vessel in a continuous manner is separated and fresh water is mixed with and separated from the organic phase to reduce the amount of residual hydrophilic impurities in the organic phase. A hydrocarbon solvent is mixed with the organic phase and the hexamethyldisiloxane carrier solvent is removed in a distillation column. The resulting hydrocarbon solvent solution of siloxane resin in the desired resin intermediate. One skilled in the art would know how to obtain a solid MQ resin suitable for use as component (A).

Component (B) is a substantially linear polydiorganosiloxane linker having the empirical formula:

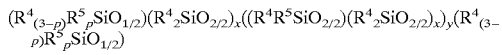

Each $R^4$ is a monovalent group independently selected from the group consisting of alkyl, aryl, and arylalkyl groups; and p is 0, 1, 2, or 3. Each $R^5$ is a monovalent group independently selected from the group consisting of hydrogen, hydroxyl, alkoxy, oximo, alkyloximo, and aryloximo groups; and x ranges from 0 to 100; and y ranges from 0 to 100. However, at least two $R^5$ groups must be present in each molecule, and the two $R^5$ groups must be bonded to different silicon atoms. If there are not at least two $R^5$ groups bonded to different silicon atoms, the ultra-high molecular weight MQ resin produced will have Mw less than 100,000. The average degree of polymerization between the silicon atoms to which the two $R^5$ groups are bonded must be less than 100, preferably in the range of 15 to 50. If the degree of polymerization between the two $R^5$ groups is higher than 100, the (A):(B) ratio would be <5.6:1 in order to produce the ultra-large molecular weight MQ resin. Each molecule of the substantially linear polydiorganosiloxane must have at least five siloxy units. Component (B) has a viscosity of 2 to 200 cSt, preferably 30 to 100 cSt.

This invention further relates to a process for making the ultra-high molecular weight MQ resin. The method comprises heating a reaction mixture comprising components (A) and (B) described above; and component (C), a catalyst, to copolymerize components (A) and (B); thereby forming the copolymerized reaction product of (A) and (B). Components (A), (B), and (C) are dissolved in component (D), a solvent, to facilitate the reaction. Component (E), a catalyst inhibitor, may also be added to the reaction mixture when addition reaction is used to copolymerize components (A) and (B). Components (A) and (B) and the amounts of each are selected such that the copolymerized reaction product has a molecular weight of 100,000 or greater.

Components (A) and (B) are copolymerized in a weight ratio of (A):(B) in the range of 5.6:1 to 44.5:1, preferably 7.0:1 to 20.0:1, and more preferably 7.8:1 to 17.0:1. However, the exact ratio selected depends on the following variables: the structure and functionality of component (A), the degree of polymerization of component (B)($DP_{(B)}$), the functionality of component (B), and whether addition reaction or condensation reaction will be used to copolymerize (A) and (B).

The applicants believe that the following guidelines will allow one skilled in the art to select an appropriate (A):(B) ratio without undue experimentation. Holding all variables constant except the $DP_{(B)}$, for a given MQ resin for component (A), as $DP_{(B)}$ increases, the Mw of the copolymerized reaction product decreases.

Holding all variable constant except the amount of component (B), for a given MQ resin for component (A) and a given linker used as component (B), as the amount of component (B) increases, Mw of the copolymerized reaction product increases. However, if too much component (B) is present (i.e., the ratio is <5.6:1), then the copolymerized reaction product could be elastomeric or could gel during heating, or the copolymerized reaction product may not be soluble in solvents. If too little component (B) is present (i.e., the ratio is >44.5:1), then the copolymerized reaction product can have Mw less than 100,000.

When (A) and (B) will be copolymerized by condensation reaction, the (A):(B) ratio is typically in the range of 5.67:1 to 25.3:1, preferably in the range of 7:1 to 20:1. When (A)

and (B) will be copolymerized by addition reaction, the (A):(B) ratio is typically in the range of 27.5:1 to 44.5:1. The Mw of the copolymerized reaction product can be controlled by varying the MQ resin (A) and linker (B), by varying the (A):(B) ratio, by varying the $DP_{(B)}$, or combinations thereof.

Components (A) and (B) can be copolymerized by condensation reaction, addition reaction, or combinations thereof. When components (A) and (B) will be copolymerized by condensation reaction, component (A) has the formula given above, however, a must be in the range of 0.07 to 0.2. If a is too low (i.e., the hydroxyl content is too low), the resulting copolymerized reaction product will have Mw less than 100,000. If a is too high (i.e., the hydroxyl content is too high), component (A) will be insoluble.

When components (A) and (B) will be copolymerized by addition reaction, component (A) has the formula above, however, b must be in the range of 0.02 to 1.5. If b is too low (i.e., the vinyl content is too low), then the resulting copolymerized reaction product will have Mw less than 100,000.

A catalyst, component (C), is required to promote the reaction. Component (C) is selected from the group consisting of (C1) a condensation reaction catalyst, (C2) an addition reaction catalyst, and combinations thereof.

When components (A) and (B) will be copolymerized by condensation reaction, component (C1), a condensation reaction catalyst, is added to the reaction mixture. Suitable condensation reaction catalysts are base catalysts including metal hydroxides such as potassium hydroxide and sodium hydroxide; metal salts such as silanolates, carboxylates, and carbonates; ammonia; amines; and titanates such as tetrabutyl titanates; and combinations thereof. Ammonia is preferred. Suitable condensation reactions are known in the art and are disclosed in U.S. Pat. No. 4,639,489 to Aizawa et al., Jan. 27, 1987, which is hereby incorporated by reference for the purpose of disclosing condensation reaction catalysts.

The composition is typically heated to a temperature of 60 to 150° C., preferably 120 to 140° C. for 1 to 24 hours to carry out the condensation reaction.

When components (A) and (B) will be copolymerized by addition reaction, component (C2), an addition reaction catalyst, is added to the reaction mixture. Component (C2) is preferably a platinum catalyst. Suitable platinum catalysts include chloroplatinic acid, alcohol solutions of chloroplatinic acid, and complexes of platinum compounds with unsaturated organic compounds such as olefins and organosiloxanes containing unsaturated hydrocarbon groups. Component (C2) is preferably a complex of platinum with an organosiloxane such as a complex of platinum with 1,3-diethenyl-1,1,3,3-tetramethyldisiloxane. The composition is typically heated to a temperature of temperature of 20 to 150° C., preferably 100 to 140° C. for 0.5 to 2 hours to carry out the addition reaction.

The reaction mixture comprises components (A), (B), (C) and component (D), an organic solvent. Examples of suitable organic solvents include alkanes such as hexane and heptane; aromatic solvents such as toluene, xylene, and benzene; ketones; and tetrahydrofuran. Toluene and xylene are preferred. The amount of solvent in the reaction mixture is 20 to 80 wt % of the composition.

When copolymerization will be carried out by addition reaction, component (E), an optional catalyst inhibitor can be added to the reaction mixture. Component (E) can be any addition reaction catalyst inhibitor. Suitable inhibitors are disclosed in U.S. Pat. No. 3,445,420 to Kookootsedes et al., May 20, 1969, which is hereby incorporated by reference for the purpose of describing catalyst inhibitors. Component (E) can be an amine such as trialkylamine, an oxime, a peroxide such as hydrogen peroxide, or an acetylenic compound such as dialkylacetylene, dicarboxylates, and acetylenic alcohols such as methylbutynol or ethynyl cyclohexanol. Component (E) is preferably ethynyl cyclohexanol. Component (E) comprises 0 to 0.05 weight percent of the composition.

After copolymerization, the solvent can be removed from the resulting ultra-high molecular weight MQ resin by any convenient means. For example, the solvent can be allowed to evaporate at ambient conditions or the ultra-high molecular weight MQ resin can be subjected to mild heat. The method of removing the solvent is not critical, and one skilled in the art would know how to remove the solvent.

This invention further relates to a composition comprising the ultra-high molecular weight MQ resin discussed above and a solvent. The ultra-high molecular weight MQ resin, comprising the copolymerized reaction product of components (A) and (B), is soluble in at least one solvent in which traditional MQ resins are soluble. "Soluble" means that, after copolymerization and removal of any solvent used in the reaction mixture to prepare the ultra-high molecular weight MQ resin, the ultra-high molecular weight MQ resin can be redissolved in a solvent in which MQ resins having Mw less than 100,000 are soluble. The ultra-high molecular weight MQ resin must form a clear solution when at least 10 wt % is dissolved in the solvent. The solvent can be, for example, benzene, toluene, xylene, hexane, heptane, and ketones.

EXAMPLES

These examples are intended to illustrate the invention to those skilled in the art and should not be interpreted as limiting the scope of the invention set forth in the claims.

In the Examples and Comparative Examples below, all parts are weight parts and all molecular weights are reported as weight average molecular weight, Mw, as determined by gel permeation chromatography (GPC) using two Plgel 5 micron Mixed-D 300×7.5 mm columns calibrated with MQ resin standard which were characterized using osmometry and light scattering. 'Me' represents a methyl group, and 'KOAc' represents $KO_2CCH_3$.

Reference Example 1

The ultra-high molecular weight MQ resins of this invention were prepared by blending component (A) component (B), and xylene in a three neck round bottomed flask equipped with a Dean-Stark trap and water cooled condenser. Component (A) was a solid MQ resin having the empirical formula

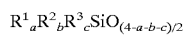
$R^1{}_aR^2{}_bR^3{}_cSiO_{(4-a-b-c)/2}$ wherein $R^1$ is a hydroxyl group, $R^3$ is a methyl group, a is 0.12, b is 0, and c is 1.28. Mw of component (A) was 12,900.

Component (B) was a predominantly linear silanol-endblocked polydimethylsiloxane having the general formula having the following general formula

$HO(SiMe_2O)_nH$, where n represents the degree of polymerization of component (B) ($DP_{(B)}$).

Reaction solutions were heated under conditions of reflux (about 140° C.) and with constant stirring in presence of catalyst as the condensation reaction between components (A) and (B) proceeded to form a copolymerized reaction product therefrom. Water was constantly removed from the system by the Dean-Starktrap. When ammonia catalyst was used, it was bubbled through the reaction solutions during the whole reaction period (24 hours). At the end of the reaction time, the flask was purged with nitrogen gas and the solution containing the reaction product was allowed to cool to ambient temperature. When KOH or KOAc was used, about 58 ppm of catalyst was added as 5% solution in methanol before heating, and the reactions were allowed to proceed for about 10 hours.

A portion of the solution was segregated and the xylene evaporated therefrom. The solid recovered was tested for solubility by attempting to dissolve it in xylene. The weight average molecular weight (Mw) was measured on the solid by GPC analysis.

Example 1

Four samples were prepared according to the method described in Reference Example 1. Weight parts of component (A) and component (B) for each sample are reported in Table 1. The $DP_{(B)}$ and the catalyst used for each sample are also reported in Table 1.

Solubility and molecular weight of the copolymerized reaction product were measured as described in Reference Example 1. The results are in Table 1.

Example 1 shows that ultra-high molecular weight MQ resins can be prepared by condensation reaction using different catalysts. Example 1 also shows that the Mw of the copolymerized reaction product increases as the amount of component (B) increases.

Comparative Example 1

Sample C1-5 was prepared as in Example 1 and solubility and molecular weight were measured on the copolymerized reaction product as in Example 1. However, an insufficient quantity of component (B) was used, resulting in molecular weight being lower than 100,000. The data and results are in Table 1.

TABLE 1

Effect on Molecular Weight of Copolymerized Reaction Product When the Amount of Component (B) is Increased

| Sample | Wt Parts of (A) | Wt Parts of (B) | $DP_{(B)}$ | (A):(B) | Catalyst | Soluble in Xylene | Mw |
|---|---|---|---|---|---|---|---|
| 1-1 | 96.2 | 3.8 | 5 | 25.32:1 | ammonia | yes | 108,000 |
| 1-2 | 92.7 | 7.3 | 5 | 12.70:1 | ammonia | yes | 433,000 |
| 1-3 | 90.8 | 9.2 | 15 | 9.87:1 | KOH | yes | 2,450,000 |
| 1-4 | 95.2 | 4.8 | 15 | 19.88:1 | ammonia | yes | 266,000 |
| C1-5 | 96.8 | 3.2 | 24 | 30.25:1 | ammonia | yes | 73,200 |

Example 2

Four samples were prepared according to the method of Reference Example 1. Weight parts of component (A) and component (B) for each sample are reported in Table 2. The $DP_{(B)}$ and the catalyst used for each sample are also reported in Table 2.

Solubility and molecular weight of the copolymerized reaction product were measured as described in Reference Example 1. The results are in Table 2.

Example 2 shows that, generally for a component (B) with a given functionality, as the $DP_{(B)}$ increases, Mw of the copolymerized reaction product decreases. Therefore, the amount of component (B) needed to produce a copolymerized reaction product having Mw of 100,000 or greater increases as $DP_{(B)}$ increases.

TABLE 2

Effect of Changing the Degree of Polymerization of Component (B)

| Sample | Wt Parts of (A) | Wt Parts of (B) | $DP_{(B)}$ | (A):(B) | Catalyst | Soluble in Xylene | Mw |
|---|---|---|---|---|---|---|---|
| 2-1 | 92.1 | 7.9 | 24 | 11.66:1 | ammonia | yes | 224,000 |
| 2-2 | 87.5 | 12.5 | 24 | 7.00:1 | ammonia | yes | 1,650,000 |
| 2-3 | 87.5 | 12.5 | 54 | 7.00:1 | KOAc | yes | 226,500 |
| 2-4 | 85 | 15 | 80 | 5.67:1 | KOAc | yes | 635,000 |
| 2-5 | 87.5 | 12.5 | 80 | 7.00:1 | KOAc | yes | 210,000 |

Reference Example 2

The ultra-high molecular weight MQ resins of this invention were prepared by blending component (A) and component (B) in a three neck round bottomed flask equipped with a water cooled condenser. Component (A) was a solid MQ resin having the empirical formula

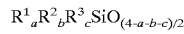
$$R^1{}_aR^2{}_bR^3{}_cSiO_{(4-a-b-c)/2}$$

wherein $R^1$ is an hydroxyl group, $R^2$ is a vinyl group, $R^3$ is a methyl group, a is equal to 0.06, b is 0.06 and c is equal to 1.29. Component (A) had Mw of 20,600.

Component (B) was a predominantly linear siloxane in the form of a random copolymer having the following empirical formula

$$Me_3SiO_{1/2}(Me_2SiO_{2/2})_{0.5}((MeHSiO_{2/2})SiO_{1/2}(Me_2SiO_{2/2})_{0.5})_{6.3}O_{1/2}SiMe_3$$

and having about 12 siloxy units in each molecule (and having the general formula

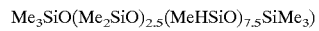
$$Me_3SiO(Me_2SiO)_{2.5}(MeHSiO)_{7.5}SiMe_3)$$

and 36 parts additional xylene and 0.004 weight parts bis(1,3-diethenyl-1,1,3,3-tetramethyldisiloxane) platinum complex, dispersed in toluene as a 0.3 weight percent solids solution.

The above mixture was then heated to 120° C. for one hour as the addition reaction between components (A) and (B) proceeded to form a copolymerized reaction product therefrom. Thereafter the solution containing the reaction product was cooled to ambient temperature.

A portion of the solution was segregated and the solvent evaporated therefrom. The solid recovered was tested for solubility by attempting to dissolve it in xylene. The molecular weight Mw was measured on the solid by GPC analysis.

Example 3

Two samples were prepared according to the method of Reference Example 2. Weight parts of component (A) and component (B) are reported in Table 3. The $DP_{(B)}$ and the catalyst used are also reported in Table 3.

Solubility and molecular weight of the copolymerized reaction product were measured as described in Reference Example 2. The results are in Table 3.

Example 3 shows that ultra-high molecular weight MQ resins can be prepared by addition reaction. Example 3 also shows that the Mw of the copolymerized reaction product increases as the amount of component (B) increases.

TABLE 3

Ultra-High Molecular Weight MQ resins Produced by Addition Reaction

| Sample | Wt Parts of (A) | Wt Parts of (B) | $DP_{(B)}$ | (A):(B) | Catalyst | Soluble in Xylene | Mw |
|---|---|---|---|---|---|---|---|
| 3-1 | 96.5 | 3.5 | 12 | 32:1 | Pt | yes | 883,700 |
| 3-2 | 97.8 | 2.2 | 12 | 44:1 | Pt | yes | 111,300 |

Comparative Example 4

Sample 4-1 was prepared using ammonia catalyst according to the method in Reference Example 1, except that component (B) was omitted. Molecular weight of the reaction product was 31,100.

Sample 4-2 was prepared according to the method in Reference Example 2, except that component (B) was omitted. Molecular weight of the reaction product was 20,600.

Comparative Example 5

Sample 5-1 was prepared according to the method in Reference Example 1, except that component (B) was replaced with tetramethoxysilane, which has a $DP_{(B)}$ of 1, and a titanate catalyst was used. The copolymerized reaction product had molecular weight of 64,850.

Comparative Examples 4 and 5 show that when component (B) has $DP_{(B)}$ less than 5, the copolymerized reaction product of (A) and (B) has molecular weight less than 100,000.

Comparative Example 6

Sample 6-1 was prepared according to the method of Reference Example 1. Weight parts of component (A) and component (B) are reported in Table 6. The $DP_{(B)}$ and the catalyst used are also reported in Table 6. Solubility and molecular weight of the reaction product were measured as described in Reference Example 1.

Sample 6-2 was prepared according to the method of Reference Example 2. Weight parts of component (A) and component (B) are reported in Table 6. The $DP_{(B)}$ and the catalyst used are also reported in Table 6. Solubility and molecular weight of the reaction product were measured as in Reference Example 2. The results are in Table 6.

Comparative Example 6 shows that if the amount of component (B) is too high, the copolymerized reaction product may not be soluble in xylene.

TABLE 6

Effect of Excess Component (B)

| Sample | Wt Parts of (A) | Wt Parts of (B) | $DP_{(B)}$ | (A):(B) | Catalyst | Soluble in Xylene | Mw |
|---|---|---|---|---|---|---|---|
| 6-1 | 91.8 | 8.2 | 15 | 11.1 | ammonia | no | not measured |
| 6-2 | 95.7 | 4.3 | 12 | 22:1 | Pt | no | not measured |

We claim:

1. An ultra-high molecular weight MQ resin comprising the copolymerized reaction product of:

(A) a solid MQ resin having weight average molecular weight less than 100,000 and having M and Q units of empirical formula

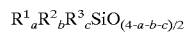

wherein: $R^1$ is a hydroxyl group, $R^2$ is a monovalent hydrocarbon group having at least one unsaturated carbon-carbon bond that is capable of addition reaction with a silicon-bonded hydrogen atom; each $R^3$ is independently selected from the group consisting of alkyl, aryl and aryla-lkyl groups, a is a number from 0 to 0.2, b is number from 0 to 1.5, and c is a number greater than or equal to 0, with the provisos that: 1>a+b+c>1.5; and when b is less than 0.02, then a is greater than or equal to 0.07; and when a is less than 0.07, then b is greater than 0.02; and (B) a substantially linear polydiorganosiloxane having empirical formula:

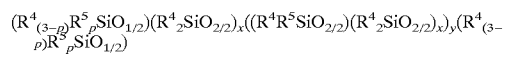

wherein each $R^4$ is a monovalent group independently selected from the group consisting of alkyl, aryl, and arylalkyl groups, each $R^5$ is a monovalent group independently selected from the group consisting of hydrogen, hydroxyl, alkoxy, oximo, alkyloximo, and aryloximo groups, p is 0, 1, 2 or 3, x is 0 to 100, y is 0 to 100 with the provisos that at least two $R^5$ groups are present in each molecule, at least two of the $R^5$ groups are bonded to different silicon atoms within the molecule, and each molecule of the substantially linear polydiorganosiloxane has a degree of polymerization of at least 5; and wherein amounts of component (A) and (B) are selected such that the copolymerized reaction product has a weight average molecular weight of at least 100,000, and the copolymerized reaction product of (A) and (B) is soluble in at least one organic solvent.

2. The ultra-high molecular weight MQ resin of claim 1, wherein each $R^3$ in component (A) is a methyl group.

3. The ultra-high molecular weight MQ resin of claim 1, wherein the weight ratio of (A):(B) ranges from 7.0:1 to 20:1.

4. The ultra-high molecular weight MQ resin of claim 3, wherein the weight ratio of (A):(B) ranges from 7.8:1 to 17.0:1.

5. The ultra-high molecular weight MQ resin of claim 1, wherein the weight average molecular weight of the copolymerized reaction product is 100,000 to 2,000,000.

6. The ultra-high molecular weight MQ resin of claim 5, wherein the weight average molecular weight of the copolymerized reaction product is 200,000 to 1,000,000.

7. A method for preparing an ultra-high molecular weight MQ resin comprising: heating a reaction mixture comprising (A) a solid MQ resin having weight average molecular weight less than 100,000 and having M and Q units of empirical formula

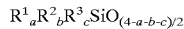

wherein: $R^1$ is a hydroxyl group, $R^2$ is a monovalent hydrocarbon group having at least one unsaturated carbon-carbon bond that is capable of addition reaction with a silicon-bonded hydrogen atom; each $R^3$ is independently selected from the group consisting of alkyl, aryl and arylalkyl groups, a is a number from 0 to 0.2, b is number from 0 to 1.5, and c is a number greater than or equal to 0, with the provisos that: 1>a+b+c>1.5; and when b is less than 0.02, then a is greater than or equal to 0.07; and when a is less than 0.07, then b is greater than 0.02;

(B) a substantially linear polydiorganosiloxane having empirical formula:

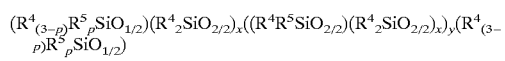

wherein each $R^4$ is a monovalent group independently selected from the group consisting of alkyl, aryl, and arylalkyl groups, each $R^5$ is a monovalent group independently selected from the group consisting of hydrogen, hydroxyl, alkoxy, oximo, alkyloximo, and aryloximo groups, p is 0, 1, 2 or 3, x is 0 to 100, y is 0 to 100 with the provisos that at least two $R^5$ are present in each molecule, at least two $R^5$ groups are bonded to different silicon atoms within the molecule, and each molecule of the substantially linear polydiorganosiloxane has a degree of polymerization of at least 5; and wherein amounts of component (A) and (B) are selected such that the copolymerized reaction product has a weight average molecular weight of at least 100,000, and the copolymerized reaction product of (A) and (B) is soluble in at least one organic solvent;

(C) a catalyst; and (D) a solvent.

8. The method of claim 7, wherein the amounts of components (A) and (B) selected are such that a weight ratio of (A):(B) is in the range of 5.67:1 to 44.5:1.

9. The method of claim 7, wherein the catalyst is selected from the group consisting of (C1) condensation reaction catalysts, (C2) addition reaction catalysts, and combinations thereof.

10. The method of claim 9, wherein components (A) and (B) will be copolymerized by condensation reaction, the catalyst is a condensation reaction catalyst (C1), and the (A):(B) ratio is in the range of 5.7:1 to 25.3:1.

11. The method of claim 10, wherein the condensation reaction catalyst is selected from the group consisting of metal hydroxides, metal salts, ammonia, amines, titanates, and combinations thereof.

12. The method of claim 9, wherein components (A) and (B) will be copolymerized by addition reaction, the catalyst is an addition reaction catalyst (C2), and the (A):(B) ratio is in the range of 27.5:1 to 44.5:1.

13. The method of claim 12, wherein the addition reaction catalyst (C2) is selected from the group consisting of chloroplatinic acid, alcohol solutions of chloroplatinic acid, complexes of platinum compounds with unsaturated organic compounds.

14. The method of claim 12, wherein component (E), a catalyst inhibitor, is added to the reaction mixture.

15. The method of claim 7, wherein the solvent is selected from the group consisting of alkanes, aromatic solvents, ketones; and tetrahydrofuran.

16. A composition comprising:

(I) an organic solvent, and (II) an ultra-high molecular weight MQ resin dissolved in the organic solvent, wherein the ultra-high molecular weight MQ resin comprises the copolymerized reaction product of:

(A) a solid MQ resin having weight average molecular weight less than 100,000 and having M and Q units of empirical formula

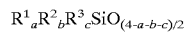

wherein: $R^1$ is a hydroxyl group, $R^2$ is a monovalent hydrocarbon group having at least one unsaturated carbon-carbon bond that is capable of addition reaction with a silicon-bonded hydrogen atom; each $R^3$ is independently selected from the group consisting of alkyl, aryl and arylalkyl groups, a is a number from 0 to 0.2, b is number from 0 to 1.5, and c is a number greater than or equal to 0, with the provisos that: 1>a+b+c>1.5; and when b is less than 0.02, then a is greater than or equal to 0.07; and when a is less than 0.07, then b is greater than 0.02; and (B) a substantially linear polydiorganosiloxane having empirical formula:

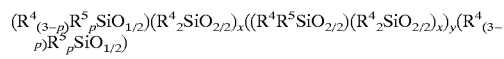

wherein each $R^4$ is a monovalent group independently selected from the group consisting of alkyl, aryl, and arylalkyl groups, each $R^5$ is a monovalent group independently selected from the group consisting of hydrogen, hydroxyl, alkoxy, oximo, alkyloximo, and aryloximo groups, p is 0, 1, 2 or 3, x is 0 to 100, y is 0 to 100 with the provisos that at least two $R^5$ are present in each molecule, at least two $R^5$ groups are bonded to different silicon atoms within the molecule, and each molecule of the substantially linear polydiorganosiloxane has a degree of polymerization of at least 5; and wherein amounts of component (A) and (B) are selected such that the copolymerized reaction product average molecular weight of at least 100,000, and the copolymerized reaction product of (A) and (B) is soluble in at least one organic solvent.

17. The composition of claim 16, wherein the solvent (I) is selected from the group consisting of benzene, xylene, toluene, and ketones.

18. The composition of claim 17, wherein the ultra-high molecular weight MQ resin (II) is present at 10 to 80 wt % of the composition.

* * * * *